Figure 1:
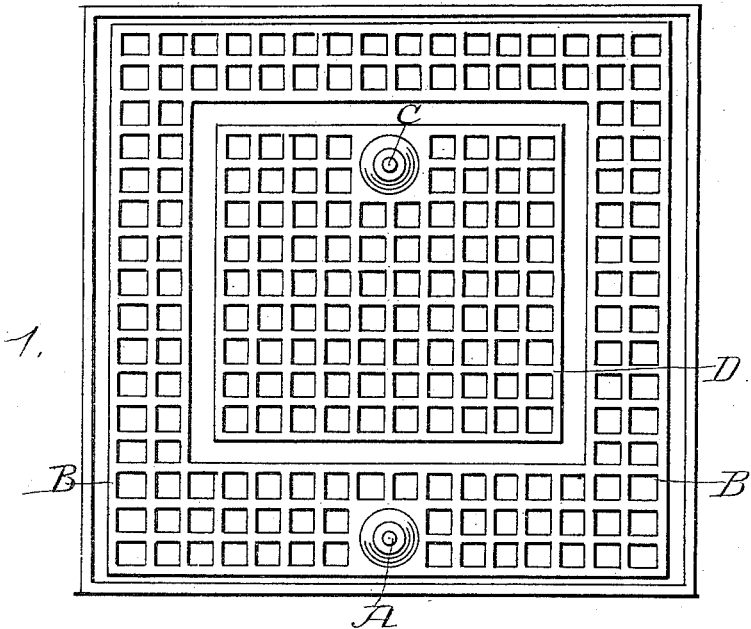

(No Model.)

J. K. PUMPELLY.
SECONDARY BATTERY.

No. 442,390. Patented Dec. 9, 1890.

Witnesses
Frank H. Goin,
George B. Howland

James Kent Pumpelly
Inventor
By his Attorney
Frank D. Thomason

UNITED STATES PATENT OFFICE.

JAMES KENT PUMPELLY, OF CHICAGO, ILLINOIS.

SECONDARY BATTERY.

SPECIFICATION forming part of Letters Patent No. 442,390, dated December 9, 1890.

Application filed February 10, 1890. Serial No. 339,863. (No model.)

*To all whom it may concern:*

Be it known that I, JAMES KENT PUMPELLY, of Chicago, Cook county, Illinois, have invented certain new and useful Improvements in Electrical Secondary Batteries, of which the following is a full, clear, and exact description, reference being had to the accompanying drawings, and to the letters of reference marked thereon.

The object of my invention is to provide a secondary battery in which the principles involved are the same as those now in extensive use, but in which the construction of the cells and arrangement of the plates of each electrode is such as to be more in harmony with laws governing the transmission of electric fluid, whereby the current is more readily liberated from the ends, edges, or sharp projections of an electrified body than from its broad surfaces; in which, as a further result of such arrangement, the gases generated have a better chance to escape and will not collect on the plates so as to interfere with the electrolytic action, and in which the dislodgment of active material from the plates of either electrode will not materially affect the general efficiency of either electrode, substantially as hereinafter fully explained, and as illustrated in the drawings, in which—

Figure 2:
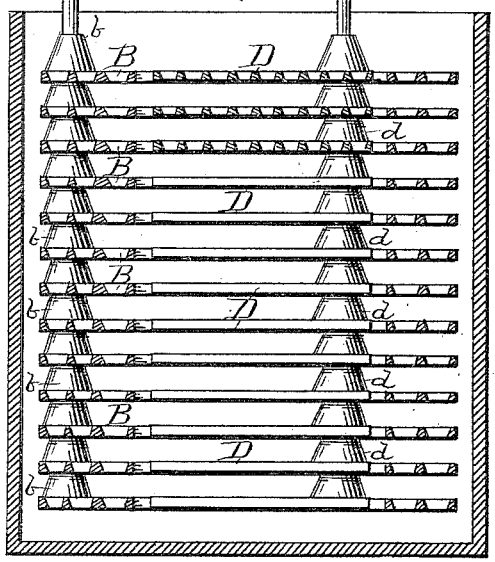

Figure 1 is a plan view of my invention. Fig. 2 is a transverse vertical section of the same.

Referring to the drawings, A represents the negative electrode, which is composed, preferably, of oblong plates B, having a large square opening in them which gives said plates the appearance of a marginal frame (which in reality they are) for the plates D of the positive electrode C. The plates D of the positive electrode are preferably oblong, and are of such surface dimension that they fit within the open area made by the opening of plates B without their edges touching. Both plates D and B are perforated or otherwise constructed so as to hold the active material. Plates B are suitably connected together by proper means. I prefer, however, to provide each plate with a hollow lug $b$, so constructed that the lug of one plate projects into and is suitably connected to the lug of the next plate above, thus forming a tube into which the electrode A is inserted longitudinally and then fixed in position by pouring molten lead in said tube around it. The plates D have similar lugs $d$, which connect in a manner similar to the way in which plates B are connected, and the electrode C is similarly embedded by surrounding it with molten lead.

I prefer to construct each electrode with the same number of plates. This, however, is not necessary so long as the necessary aggregate surface dimensions are obtained from the combined plates of each electrode, or so long as the aggregate electric efficiency of each electrode is relatively correct.

In Figs. 1 or 2 of the drawings I show the same number of plates for each electrode and place the top plates of each electrode and the corresponding plates thereof below the top plate on the same horizontal plane. This is the arrangement that is greatly preferred, but obviously need not be adhered to so long as the positive plates are surrounded by the negative, or vice versa.

I consider it immaterial what the shape of the plates of the positive or negative electrode may be, because it is obvious that certain shapes would give more edge surface to the contiguous edges of the opposing plates than others. I do not wish, moreover, to be confined to negative plates that wholly surround the positive plates, because it comes within the spirit of my invention if the negative but partially surrounds the positive plates, or vice versa.

What I claim as new is—

1. In an electrical secondary battery, the set of plates of one electrode arranged with their broad sides parallel to each other and having corresponding openings in them in register with each other, in combination with the plates of the other electrode arranged with their broad sides parallel with each other and on the same plane as or parallel with the plates of the other electrode and placed within the opening of the first-mentioned set of plates, as set forth.

2. The combination, with an electrical secondary battery, of plates B of the negative electrode arranged and secured together so that their broad surfaces are parallel to each other and their corresponding outer edges bordered by substantially the same planes, each having a corresponding central opening therein located with reference to each other and producing an open area surrounded by said plates, and the plates D, secured together so that their broad surfaces are parallel and on the same plane as or parallel with the plates of the other electrode, and of such corresponding surface dimensions that they can be placed within the area made by the openings in said plates B and on a similar plane therewith, as set forth.

3. The combination, with an electrical secondary battery, of the plates of the negative electrode and the plates of the positive electrode, all having their broad surfaces on the same or parallel planes, so constructed and relatively arranged that the electrolytic action takes place between the edges of the plates of the opposing electrodes in contradistinction to their broad surfaces.

JAMES KENT PUMPELLY.

Witnesses:
FRANK D. THOMASON,
FRANK H. GOIN.